United States Patent
Deshmukh et al.

(10) Patent No.: US 11,074,270 B2
(45) Date of Patent: Jul. 27, 2021

(54) SYSTEM AND METHOD FOR DATA INTEGRATION

(71) Applicant: SAP SE, Walldorf (DE)

(72) Inventors: Sachin Deshmukh, Atlanta, CA (US);
Manish Jaiswal, Dallas, TX (US);
Manoj Narayan, Palo Alto, CA (US);
Hermann Schuster, Dallas, TX (US);
Srujan Gogineni, Dallas, TX (US)

(73) Assignee: SAP SE, Walldorf (DE)

( * ) Notice: Subject to any disclaimer, the term of this patent is extended or adjusted under 35 U.S.C. 154(b) by 243 days.

(21) Appl. No.: 15/382,393

(22) Filed: Dec. 16, 2016

(65) Prior Publication Data

US 2017/0262515 A1 Sep. 14, 2017

Related U.S. Application Data

(60) Provisional application No. 62/307,276, filed on Mar. 11, 2016.

(51) Int. Cl.
*G06F 16/25* (2019.01)
*G06F 16/27* (2019.01)

(52) U.S. Cl.
CPC ............ *G06F 16/258* (2019.01); *G06F 16/27* (2019.01)

(58) Field of Classification Search
CPC ......... G06F 17/30569; G06F 17/30283; G06F 16/258; G06F 16/27
See application file for complete search history.

(56) References Cited

U.S. PATENT DOCUMENTS

| | | | | |
|---|---|---|---|---|
| 2002/0099735 A1* | 7/2002 | Schroeder | ............... | G06F 17/21 707/513 |
| 2004/0194112 A1* | 9/2004 | Whittenberger | .. | G06F 17/30569 719/310 |
| 2005/0091251 A1* | 4/2005 | Ramarao | ........... | G06F 17/30569 |
| 2010/0042588 A1* | 2/2010 | Smyros | ................. | G06F 16/248 707/706 |
| 2010/0332479 A1* | 12/2010 | Prahlad | ................. | G06F 3/0649 707/741 |
| 2011/0264745 A1* | 10/2011 | Ferlitsch | ............. | H04L 12/1827 709/205 |
| 2013/0018904 A1* | 1/2013 | Mankala | ........... | G06F 17/30011 707/756 |
| 2017/0134323 A1* | 5/2017 | Alexander | .............. | H04L 51/16 |

* cited by examiner

*Primary Examiner* — Alford W Kindred
*Assistant Examiner* — Lin Lin M Htay
(74) *Attorney, Agent, or Firm* — Fountainhead Law Group P.C.

(57) ABSTRACT

Some embodiments provide a non-transitory machine-readable medium that stores a program. The program receives a document from a first computing system that is destined for a second computing system via a network platform. The program further identifies an integration configuration associated with the first computing system. The program also determines a document format of the document. The program further transforms the document format of the document from a first document format to a second document format based on the integration configuration. The program also sends the document in the second document format to the network platform in order for the network platform to forward the document to the second computing system.

20 Claims, 9 Drawing Sheets

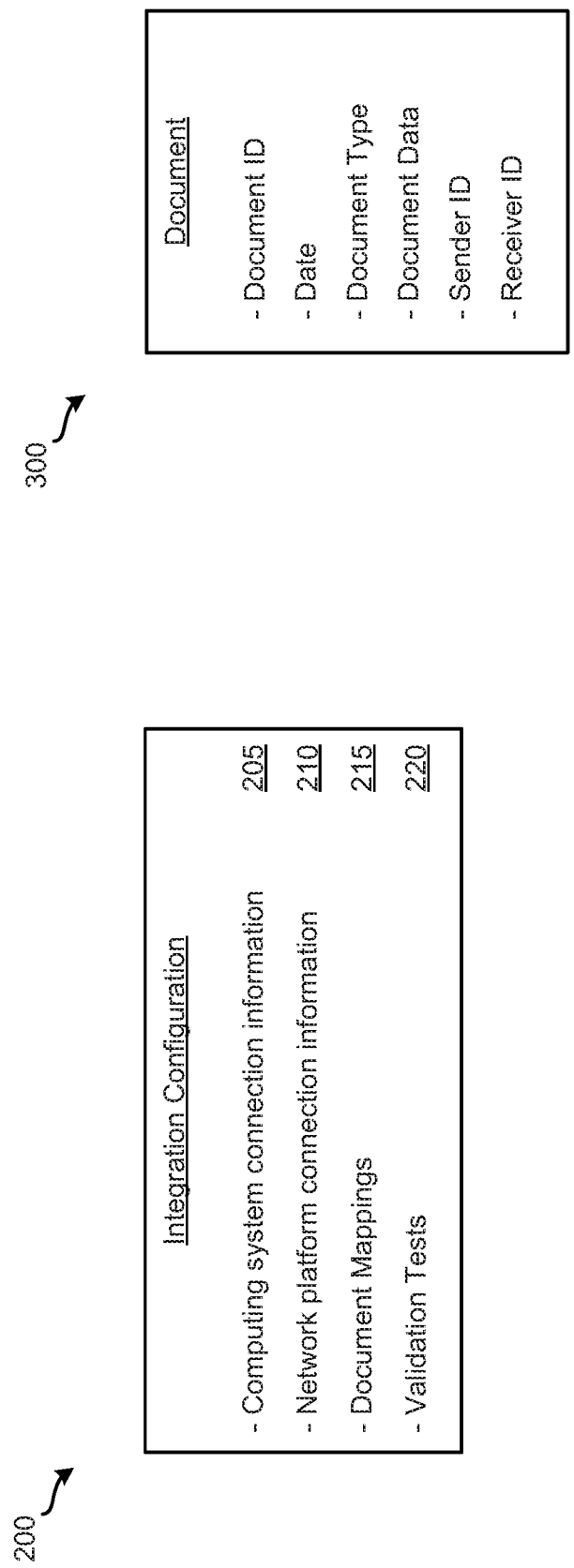

SYSTEM AND METHOD FOR DATA INTEGRATION

CROSS-REFERENCE TO RELATED APPLICATION

The present application claims the benefit and priority of U.S. Provisional Application No. 62/307,276, filed Mar. 11, 2016, entitled "Integration Gateway," the entire contents of which are incorporated herein by reference in its entirety for all purposes.

BACKGROUND

The current landscape of computer technology contains various different computing systems. For example, many organizations use a variety of different computing systems implemented using any number of different technologies. As such, different computing systems may manage data in different ways. For instance, such computing systems may use different software applications (e.g., database management systems (DBMSs), master data management (MDM) applications, etc.) to manage and store semantically similar data using different formats, data types (e.g., strings, integers, floating points, etc.), operators, etc.

Various different types of tools may be employed to integrate data in different computing systems. In some instances, enterprise application integration (EAI) tools are used to integrate different applications and/or systems. In other instances, extract, transform, load (ETL) tools are utilized to integrate data from multiple systems. In yet other instances, middleware tools may be employed to facilitate communication and interaction between such different computing systems.

SUMMARY

In some embodiments, a non-transitory machine-readable medium stores a program. The program receives a document from a first computing system that is destined for a second computing system via a network platform. The program further identifies an integration configuration associated with the first computing system. The program also determines a document format of the document. The program further transforms the document format of the document from a first document format to a second document format based on the integration configuration. The program also sends the document in the second document format to the network platform in order for the network platform to forward the document to the second computing system.

In some embodiments, the integration configuration includes connection information for connecting to the network platform and a set of document mappings, each document mapping specifying a source document format, a target document format, and a document type. The program may further determine a document type of the document. Transforming the document format of the document may include identifying a document mapping in the set of document mappings that specifies a source document format that matches the determined document format of the document and a document type that matches the determined document type of the document. Transforming the document format of the document may further include generating a version of the document in the target document format specified in the identified document mapping.

In some embodiments, the second document format is a common intermediary document format supported by the network platform. Sending the document to the network platform may include establishing a connection to the network platform using the connection information specified in the integration configuration.

In some embodiments, a method receives a document from a first computing system that is destined for a second computing system via a network platform. The method further identifies an integration configuration associated with the first computing system. The method also determines a document format of the document. The method further transforms the document format of the document from a first document format to a second document format based on the integration configuration. The method also sends the document in the second document format to the network platform in order for the network platform to forward the document to the second computing system.

In some embodiments, the integration configuration includes connection information for connecting to the network platform and a set of document mappings, each document mapping specifying a source document format, a target document format, and a document type. The method may further determine a document type of the document. Transforming the document format of the document may include identifying a document mapping in the set of document mappings that specifies a source document format that matches the determined document format of the document and a document type that matches the determined document type of the document. Transforming the document format of the document may further include generating a version of the document in the target document format specified in the identified document mapping.

In some embodiments, the second document format is a common intermediary document format supported by the network platform. Sending the document to the network platform may include establishing a connection to the network platform using the connection information specified in the integration configuration.

In some embodiments, a system includes a set of processing units and a non-transitory computer-readable medium storing instructions. The instructions cause at least one processing unit to receive a document from a first computing system that is destined for a second computing system via a network platform. The instructions further cause the at least one processing unit to identify an integration configuration associated with the first computing system. The instructions also cause the at least one processing unit to determine a document format of the document. The instructions further cause the at least one processing unit to transform the document format of the document from a first document format to a second document format based on the integration configuration. The instructions also cause the at least one processing unit to send the document in the second document format to the network platform in order for the network platform to forward the document to the second computing system.

In some embodiments, the integration configuration includes connection information for connecting to the network platform and a set of document mappings, each document mapping specifying a source document format, a target document format, and a document type. The instructions may further cause the at least one processing unit to determine a document type of the document. Transforming the document format of the document may include identifying a document mapping in the set of document mappings that specifies a source document format that matches the determined document format of the document and a document type that matches the determined document type of the document. Transforming the document format of the document may further include generating a version of the document in the target document format specified in the identified document mapping. Sending the document to the network platform may include establishing a connection to the network platform using the connection information specified in the integration configuration.

The following detailed description and accompanying drawings provide a better understanding of the nature and advantages of the present invention.

BRIEF DESCRIPTION OF THE DRAWINGS

FIG. 2 illustrates an integration configuration according to some embodiments.

FIG. 3 illustrates an example document according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a system for integrating data between different computing systems. In some embodiments, the system facilitates the communication of data between two sets of computing systems. The computing systems in the two sets of computing systems may handle data in different formats. As such, when the system receives data from a computing system in the first set of computing systems that is destined for a computing system in the second set of computing systems, the system may transform the format of the data from a first data format to a second data format. The system then sends the data in the second data format to the computing system in the second set of computing systems. In some cases, the system may receive data from a computing system in the second set of computing systems that is destined for a computing system in the first set of computing systems. In such a case, the system may transform the format of the data from a first data format to a second data format that is specified by the computing system in the first set of computing systems. The system then sends the data in the second data format to the computing system in the first set of computing systems.

Figure 1:
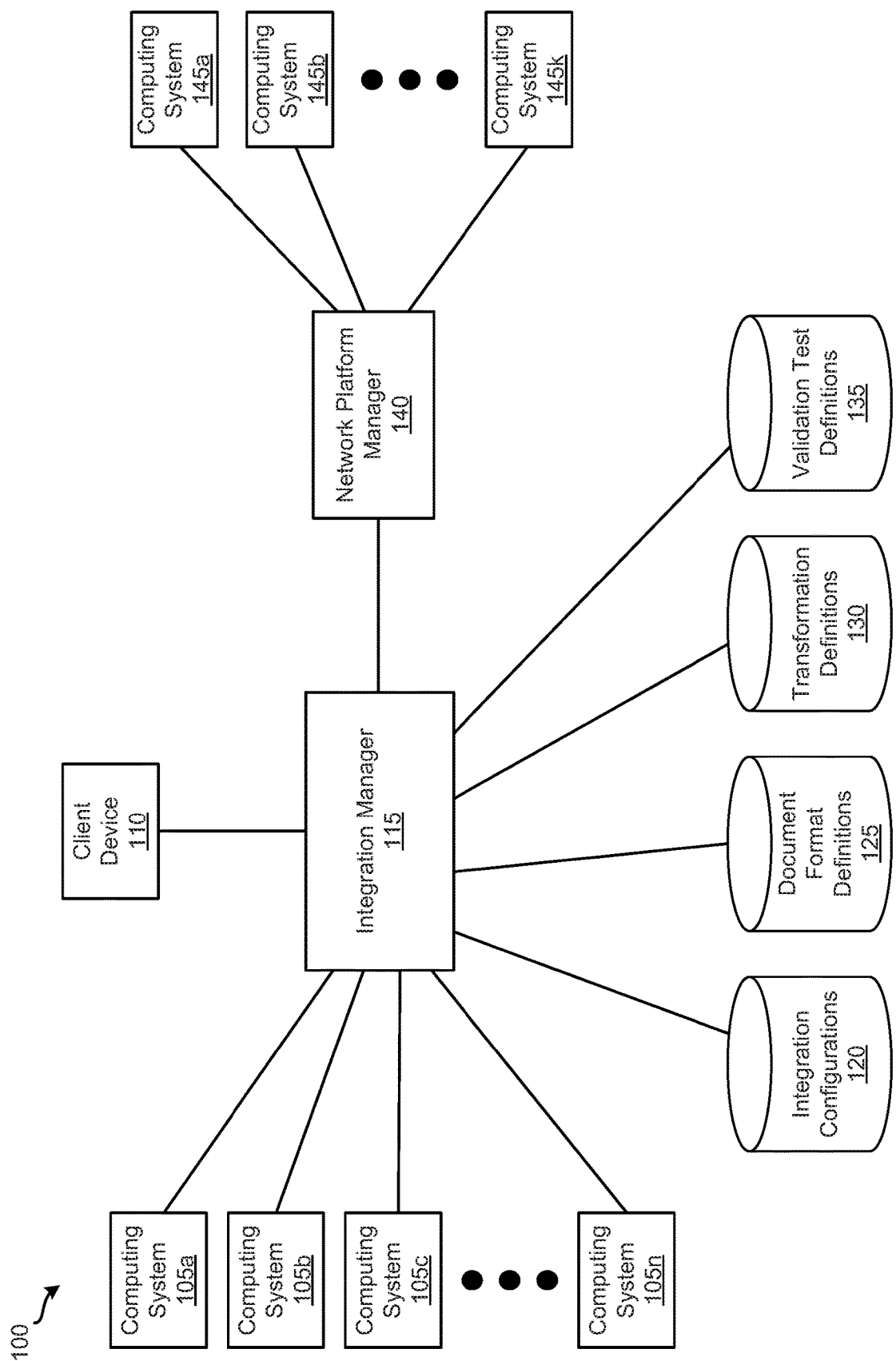
FIG. 1 illustrates a system that includes an integration manager according to some embodiments.

FIG. 1 illustrates a system 100 that includes an integration manager according to some embodiments. As shown, system 100 includes computing system 105a-n, client device 110, integration manager 115, storages 120-135, network platform manager 140, and computing systems 145a-k. Computing system 105a-n (e.g., supplier computing systems) are configured to send (e.g., via a network) integration manager 115 data (e.g., documents) destined for one or more computing systems 145a-k. In addition, computing systems 105a-n may be configured to receive from integration manager 115 data originating from one or more computing systems 145a-k. Computing systems 145a-k are configured to send (e.g., via a network) network platform 140 data destined for one or more computing systems 105a-n. Additionally, computing systems 145 a-k may be configured to receive from network platform 140 data originating from one or more computing systems 105a-n.

Client device 110 may communicate with integration manager 115 (e.g., via a web browser operating on client device 110) in order to create integration configurations associated with computing systems 105a-n. For instance, a user may use client device 110 to send integration manager 115 a request to create an integration configuration associated with a particular computing system 105 and then send integration manager 115 configuration settings for the integration configuration. Although FIG. 1 shows one client device 110, one of ordinary skill in the art will recognize that system 100 may include any number of additional and/or different client devices.

Integration manager 115 is configured to facilitate integration of data between computing systems 105a-n and computing system 140a-k. In some embodiments, integration manager 115 provides a user of client device 110 an option (e.g., via a graphical user interface (GUI), a command line interface (CLI), etc.) to create an integration configuration associated with a computing system 105. Through such an option, integration manager 115 may receive from the user of client device 110 configuration settings for an integration configuration. As an example, FIG. 2 illustrates an integration configuration 200 according to some embodiments. As shown, integration configuration 200 includes computing system connection information 205, network platform connection information 210, document mappings 215, and validation tests 220.

Computing system connection information 205 includes connection information for connecting to a computing system 105. Such connection information may include a connection/transport type (e.g., an application statement 2 (AS2) connection/transport, an X.400 connection/transport, a simple mail transfer protocol (SMTP) connection/transport, a hypertext transfer protocol (HTTP) secure (HTTPS) connection/transport, etc.), a set of document types, a uniform resource locator (URL) associated with a computing system 105, and an authentication type (e.g., basic, certificate, etc.).

In some embodiments, the set of document types includes one or more of the following: XMLPayRequest, OrderRequest, MasterAgreementRequest, PunchOutSetupRequest, CopyRequest, ContractStatusUpdateRequest, ProfileRequest, PurchaseRequisitionRequest, ProviderSetupRequest, StatusUpdateRequest, GetPendingRequest, SubscriptionListRequest, SubscriptionContentRequest, SupplierListRequest, SupplierDataRequest, SubscriptionStatusUpdateRequest, CatalogUploadRequest, AuthRequest, DataRequest, OrganizationDataRequest, ConfirmationRequest, ShipNoticeRequest, ServiceEntryRequest, TimeCardInfoRequest, ReceiptRequest, OrderStatusRequest, TimeCardRequest, ComponentConsumptionRequest, InvoiceDetailRequest, PaymentRemittanceRequest, PaymentRemittanceStatusUpdateRequest, PaymentProposalRequest, SessionStatusRequest, OrderStatusSetupRequest, InvoiceRequest, NotificationRequest, PrivateOrganizationRequest, CatalogChangeRequest, OrderStatusDataRequest, SourcingUpdateRequest, ContentRequest, RelationshipRequest, RFxEventRequest, ProviderDataRequest, SearchRequest, MapSyncRequest, CollaborationRequest, RFxPublishRequest, L3ChargeFileRequest, BlanketOrderStatusUpdateRequest, SalesOrderRequest, PriceAvailabilityRequest, DataSyncChangeListRequest, DataSyncDataRequest, S4DataPushRequest, UpdateMigratedSupplierRequest, QuoteRequest, ProductReplenishmentMessage, PunchOutOrderMessage, ProviderDoneMessage, SubscriptionChangeMessage, DataAvailableMessage, SupplierChangeMessage, OrganizationChangeMessage, ProductActivityMessage, ProviderSetupResponse, TransportRequest, TransportConfirmation, TradeRequest, PaymentBatchRequest, SessionStatusResponse, OrderStatusSetupResponse, PrivateOrganizationResponse, DataResponse, AuthResponse, ContentResponse, RelationshipResponse, ProviderDataResponse, SearchResponse, PriceAvailabilityResponse, DataSyncChangeListResponse, DataSyncDataResponse, OrganizationDataResponse, S4DataPushResponse, OrderStatusDoneMessage, QuoteDataMessage, and/or QuoteMessage.

If the authentication type is a basic authentication, computer system connection information 205 may include a username and password for logging into the computing system 105. If the authentication type is a certificate authentication, computer system connection information 205 may include a certificate identifier associated with a certificate used for authentication. If the connection/transport type is an AS2 connection/transport, computer system connection information 205 can include a message disposition notification (MDN) type (e.g., asynchronous, synchronous, etc.) an MDN URL, a secure/multipurpose Internet mail extensions (S/MIME) type (e.g., plain, signed, encrypted, signed and encrypted, etc.), an encryption algorithm (e.g., triple data encryption algorithm (3DES), etc.), an encryption certificate identifier associated with a certificate used for encryption, and an acknowledgement URL. Network platform connection information 210 includes the same and/or similar information as computer system connection information 205 except the information is for connecting to an account in a network platform managed by network platform manager 140.

Document mappings 215 can include one or more document mappings. Each document mapping may specify a transmit direction (e.g., receive or send), a source document format, a version of the source document format, a target document format, a version of the target document format, and a document type. A transmit direction of "receive" indicates that the document mapping is applicable to documents that integration manager 115 receives from a computing system 145 via network platform manager 140 and are destined for the computing system 105. A transmit direction of "send" indicates that the document mapping is applicable to documents that integration manager 115 receives from computing system 105 and are destined for one or more computing systems 145a-k via network platform manager 140.

The source document format and the version of the source document format specifies a document format and a version of the document format of a document received by integration manager 115 from a computing system 105 or a computing system 145. The target document format and the version of the target document format specifies a document format and a version of the document format of a document sent by integration manager 115 to a computing system 105 or a computing system 145. Examples of document formats include an American National Standards Institute (ANSI) Accredited Standards Committee (ASC) X12 format, a Verband der Automobilindustrie (VDA) format, an organization for data exchange by tele transmission in Europe (ODETTE) format, an electronic data interchange for administration, commerce, and transport (EDIFACT) format, a commerce extensible markup language (cXML) format, etc. Document types may include purchase orders, invoices, etc.  ARE THERE ANY OTHER DOCUMENT TYPES THAT SHOULD BE INCLUDED?

Validation tests 220 may include a set of validation tests to be performed based on the integration configuration. The set of validation tests may be selected from the collection of validation test definitions stored in validation test definitions storage 135. The collection of validation test definitions may include a set of order request validation tests (e.g., an order request with a standard single line item without attachments, an order request with a standard single line item with special characters, an order request with a standard multiple line items without attachments, an order request with a standard multiple line items with special characters, an order request with a service single line item without attachments, an order request with a service single line item with special characters, an order request with a service multiple line items without attachment, an order request with a service multiple line items with special characters, an order request with a blanket single line item without attachments, an order request with a blanket single line item with special characters, an order request with a blanket multiple line items without attachments, an order request with a blanket multiple line items with special characters, etc.), a set of change order request validation tests (e.g., a change order request with a standard single line item without attachments, a change order request with a standard single line item with special characters, a change order request with a standard multiple line items without attachments, a change order request with a standard multiple line items with special characters, a change order request with a service single line item without attachments, a change order request with a service single line item with special characters, a change order request with a service multiple line items without attachments, a change order request with a service multiple line items with special characters, a change order request with a blanket single line item without attachments, a change order request with a blanket single line item with special characters, a change order request with a blanket multiple line items without attachments, a change order request with a blanket multiple line items with special characters, etc.), a set of confirmation request validation tests, a set of shipment notice request validation tests, and a set of invoice detail request validation test (e.g., an invoice with a single line item without attachments). One of ordinary skill in the art will appreciate that the collection of validation test definitions may include any number of additional and/or different validation test definitions for validating the document format of documents and/or the data in documents. In some embodiments, a predefined subset of the collection of validation tests may be required to be selected and included in validation tests 220.

While FIG. 2 illustrates configuration settings for one example integration configuration, one of ordinary skill in the art will understand that different integration configurations may include additional and/or different configuration settings. For example, integration configuration 200 may additionally include information specifying one or more computing systems 145*a-k* with which data is integrated. As another example, integration configuration 200 may also include cross-reference data for identifying the computing system 105 associated with the integration configuration (e.g., a network platform ID, an electronic data interchange (EDI) qualifier, an EDI interchange ID, an EDI group ID, etc.) and data for identifying one or more computing systems 145*a-k* (e.g., a name, a network platform ID, a network platform interchange ID, an EDI group ID, etc.).

Returning to FIG. 1, after receiving configuration settings for an integration configuration from a user of client device 110, integration manager 115 generates the integration configuration based on the configuration settings and stores the integration configuration in integration configurations storage 120. Integration manager 115 may then provide the user of client device 110 an option either to start performing the set of validation tests specified in the integration configuration or to specify a date and time at which the set of validation tests are to be performed. When integration manager 115 performs the set of validation tests, integration manager 115 connects to the computing system 105 based on the computing system connection information specified in the integration configuration and performs the set of validation tests on the computing system 105. If the set of validation tests are passed, integration manager 115 provides the user of client device 110 an option to deploy the integration configuration.

When integration manager 115 receives a request to deploy the integration configuration from the user of client device 110, integration manager 115 deploys the integration configuration. Once the integration configuration is deployed, the computing system 105 associated with the integration configuration may send integration manager 115 data (e.g., documents) destined for one or more computing systems 145*a-k*. Integration manager 115 can process such data based on the integration configuration and then forward the data to the intended one or more computing systems 145*a-k*. Similarly, integration manager 115 may process data received from one or more computing systems 145*a-k* via network platform manager 140 that are destined for the computing system 105 associated with the integration configuration.

To process a document received from a computing system 105, integration manager 115 identifies an integration configuration stored in integration configurations storage 120 that is associated with the computing system 105. Next, integration manager 115 determines the document format and the document format version of the document based on the document format definitions stored in document format definitions storage 125. In some embodiments, the document format and the document version of the document are determined by identifying a document format definition that specifies a document schema that matches the document schema of the document. The document format and the document format version of the document is the document format and the document format version specified by the identified document format definition.

Integration manager 115 then determines a document type of the document (e.g., a purchase order, an invoice, etc.) based on the determined document format and document version of the document. Next, integration manager 115 identifies a document mapping in the integration configuration that specifies a transmit direction of "send," a source document format and source document format version that matches the determined document format and document format version of the document, and a document type that matches the identified document type of the document. If the integration configuration does not include such a document mapping, integration manager 115 does not process the document and sends the computing system 105 a message indicating so. If the integration configuration does include such a document mapping, integration manager 115 transforms the document from the determined document format to the target document format and target document format version specified in the document mapping.

Integration manager 115 uses the transformation definitions stored in transformation definitions storage 130 to transform the document format of the document. In particular, integration manager 115 identifies a transformation definition in transformation definitions storage 130 that is configured to transform a document from the existing document format of the document to the target document format specified in the identified document mapping. Integration manager 115 processes the document based on the identified transformation definition in order to generate a version of the document in the target document format and target document format version specified in the identified document mapping. After transforming the document, integration manager 115 establishes a connection to the network platform managed by network platform manager 140 according to the network platform connection information specified in the integration configuration. Through the connection, integration manager 115 sends the transformed document to network platform manager 140, which processes and forwards the document to the destined computing system 145.

As mentioned above, integration manager 115 may also process data received from one or more computing systems 145*a-k* via network platform manager 140 that are destined for the computing system 105 associated with an integration configuration once the integration configuration is deployed. To process a document received from a computing system 145 that is destined for a computing system 105, integration manager 115 identifies an integration configuration stored in integration configurations storage 120 that is associated with the computing system 105. Integration manager 115 then determines the document format and the document format version of the document based on the document format definitions stored in document format definitions storage 125. In some embodiments, the document format and the document version of the document are determined by identifying a document format definition that specifies a document schema that matches the document schema of the document. The document format and the document format version of the document is the document format and the document format version specified by the identified document format definition.

Next, integration manager 115 determines a document type of the document (e.g., a purchase order, an invoice, etc.) based on the determined document format and document version of the document. Integration manager 115 then identifies a document mapping in the integration configuration that specifies a transmit direction of "receive," a source document format and source document format version that matches the determined document format and document format version of the document, and a document type that matches the identified document type of the document. If the integration configuration does not include such a document mapping, integration manager 115 does not process the document and sends the computing system 105 a message indicating so. If the integration configuration does include such a document mapping, integration manager 115 transforms the document from the determined document format to the target document format and target document format version specified in the document mapping.

Integration manager 115 uses the transformation definitions stored in transformation definitions storage 130 to transform the document format of the document. In particular, integration manager 115 identifies a transformation definition in transformation definitions storage 130 that is configured to transform a document from the existing document format of the document to the target document format specified in the identified document mapping. Integration manager 115 processes the document based on the identified transformation definition in order to generate a version of the document in the target document format and target document format version specified in the identified document mapping. After transforming the document, integration manager 115 establishes a connection to the computing system 105 according to the computing system connection information specified in the integration configuration. Through the connection, integration manager 115 sends the transformed document to the computing system 105.

FIG. 3 illustrates an example document 300 according to some embodiments. Specifically, document 300 is an example of a document that integration manager 115 may receive from a computing system 105 that is destined for a computing system 145 and/or a document that integration manager 115 may receive from a computing system 145 via network platform manager 140 that is destined for a computing system 105. As shown, document 300 includes a document ID for uniquely identifying document 300, a date indicating when document 300 was transmitted, a document type of document 300 (e.g., a purchase order, an invoice, etc.), a sender ID for indicating the sender of document 300, and a receiver ID for indicating the receiver of document 300. In some embodiments, the sender ID and receiver ID are each a network platform ID used by network platform manager 140 to identify a computing system (e.g., a computing system 105 or a computing system 145) in the platform managed by network platform manager 140.

Returning to FIG. 1, storages 120-135 are configured to store various different types of data. Specifically, integration configurations storage 115 stores integration configurations. Document format definitions 120 is configured to store definitions of document formats. Examples of document formats for which document format definitions 120 stores definitions may include an ASC X12 format, a VDA format, an ODETTE format, an EDIFACT format, a cXML format, etc. A particular document format may have several different versions. As such, document format definitions storage 120 may store different definitions for different versions of the particular document format. Transformation definitions storage 130 stores definitions for transforming a document from a first format defined by a definition stored in document format definitions storage 120 to a second, different format defined by a definition stored in document format definitions storage 120. In some embodiments, a transformation definition is implemented via an extensible stylesheet language transformation (XSLT) language. Validation test definitions storage 135 is configured to store definitions of validation tests, such as the validation tests described above, that are performed on integration configurations before deployment of the integration configurations. In some embodiments, integration manager 115 and data storages 120-135 are implemented on the same computing system (e.g., a cloud computing system). In other embodiments, data storages 120-135 are external to a system on which integration manager 115 is implemented.

Network platform manager 140 is responsible for managing a platform that facilitates transactions between users of computing systems 105a-n (e.g., suppliers or vendors) and users of computing systems 145a-k (e.g., buyers). In some embodiments, network platform manager 140 provides an interface (e.g., a web portal) through which users of computing systems 105 a-n manage and store information associated with suppliers (e.g., supplier information), items (e.g., goods and/or services) the suppliers are offering for sale to users of computing systems 105a-n, order acknowledgements for purchases of items, change order acknowledgments, order status responses, shipment notices for the purchases, invoicing for the purchases, request for quotes (RFQs) for items, etc. Network platform manager 140 also allows, through the interface, users of computing systems 145a-k to manage and store information associated with buyers (e.g., buyer information), items (e.g., goods and/or services) offered for sale by users of computing systems 105a-n, order requests for items, change order requests, order status requests, payments for the purchases, etc. In some embodiments, integration manager 115 and network platform manager 140 are implemented on the same computing system (e.g., a cloud computing system). In other embodiments, integration manager 115 and network platform manager 140 are implemented on separate systems.

Network platform manager 140 is also configured to facilitate the communication of data between computing systems 105a-n and computing systems 145a-k. For instance, network platform manager 140 may facilitate the transmission of documents between computing systems 145a-k and computing system 105a-n. In some embodiments, network platform manager 140 manages any number of different document formats. In other embodiments, network platform manager 140 manages such documents in a common intermediary document format (e.g., a cXML format). As such, in some such other embodiments, document mappings in an integration configuration with a transmit direction of "send" may specify the target document format and the version of the target document format as the common intermediary document format. Similarly, document mappings in the integration configuration with a transmit direction of "receive" may specify the source document format and the version of the source document format as the common intermediary document format. In some such other embodiments, network platform manager 140 receives documents from computing systems 145a-k and documents from computing systems 105a-n via integration manager 115 in the common intermediary document format. In other such other embodiments, network platform manager 140 transforms documents received from computing systems 145a-k and documents from computing systems 105a-n via integration manager 115 into the common intermediary document format.

Figure 4:
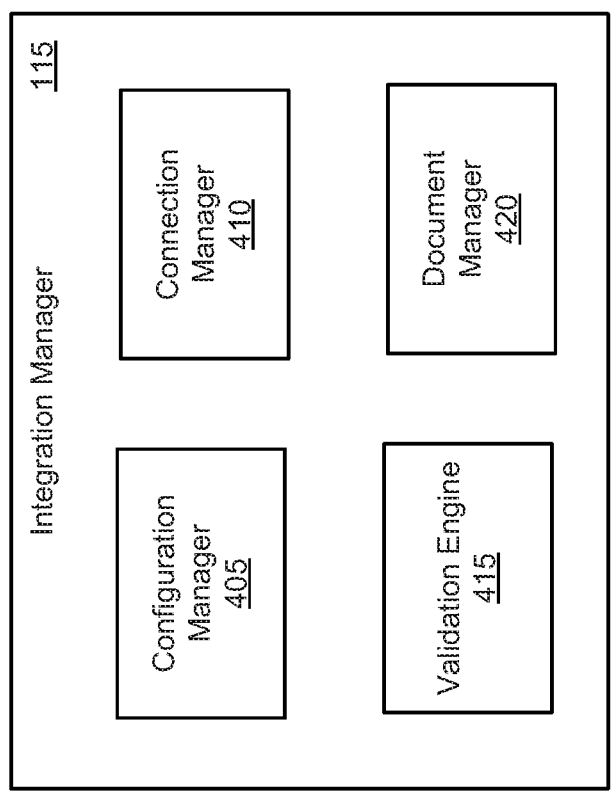
FIG. 4 illustrates an architecture of an integration manager according to some embodiments.

FIG. 4 illustrates an architecture of an integration manager 115 according to some embodiments. As shown, integration manager 115 includes configuration manager 405, connection manager 410, validation engine 415, and document manager 420. Configuration manager 405 is responsible for managing integration configurations associated with computing systems 105a-n. For example, once integration manager 115 receives configuration settings for an integration configuration, configuration manager 405 generates the integration configuration based on the configuration settings and stores the integration configuration in integration configurations storage 120. When integration manager 115 starts performing validation tests for an integration configuration associated with a computing system 105, configuration manager 405 identifies and retrieves the integration configuration associated with the computing system 105 from integration configurations storage 120 so that connection manager 410 can connect to the computing system 105 and validation engine 415 can perform the validation tests specified in the integration configuration. Upon integration manager 115 receiving a request to deploy an integration configuration, configuration manager 405 identifies the integration configuration stored in integration configurations storage 120 and deploys the integration configuration. In addition, configuration manager 405 may identify an integration configuration stored in integration configurations storage 120 that is associated with a computing system 105 when integration manager 115 receives the document from the computing system 105 or when integration manager 115 receives the document from a computing system 145 via network platform manager 140 that is destined for the computing system 105.

Connection manager 410 is configured to connect to computing systems 105a-n and network platform manager 140. For instance, during validation test performance, connection manager 410 uses computing system connection information specified in the integration configuration identified by configuration manager 405 to connect to a computing system 105. Similarly, during processing of a document received from network platform manager 140 that is destined for a computing system 105, connection manager 410 uses computing system connection information specified in the integration configuration identified by configuration manager 405 to connect to the computing system 105 in order to send the document to the computing system 105 once the document manager 420 has transformed the document format of the document. During processing of a document received from a computing system 105, connection manager 410 uses network platform connection information specified in the integration configuration identified by configuration manager 405 to connect to network platform manager 140 in order to send the document to a destined computing system 145 once the document manager 420 has transformed the document format of the document.

Validation engine 415 is configured to perform validation tests for integration configurations. To perform validation tests for an integration configuration, validation engine 415 may identify and retrieve the validation test definitions stored in validation test definitions storage 135 associated with the validation tests specified in the integration configuration. Validation engine 415 performs the validation tests based on the identified validation test definitions and the connection that connection manager 410 establishes with the computing system 105.

Document manager 420 handles the processing of documents received from computing systems 105a-n and computing systems 145a-k via network platform manager 140. For example, when integration manager 115 receives a document from a computing system 105 and configuration manager 405 identifies an integration configuration associated with the computing system 105, document manager 420 determines the document format and the document format version of the document based on the document format definitions stored in document format definitions storage 125. Next, document manager 420 determines a document type of the document (e.g., a purchase order, an invoice, etc.) based on the determined document format and document version of the document and identifies a document mapping in the integration configuration that specifies a transmit direction of "send," a source document format and source document format version that matches the determined document format and document format version of the document, and a document type that matches the identified document type of the document. Document manager 420 then transforms the document from the determined document format to the target document format (e.g., a common intermediary document format supported by network platform manager 140, a document format specified by a computing system 145 for which the document is destined, etc.) and target document format version specified in the document mapping by using the transformation definitions stored in transformation definitions storage 130 and generating a version of the document in the target document format and target document format version.

As another example, when integration manager 115 receives a document from a computing system 145 via network platform manager 140 that is destined for a computing system 105 and configuration manager 405 identifies an integration configuration associated with the computing system 105, document manager 420 determines the document format and the document format version of the document based on the document format definitions stored in document format definitions storage 125. Document manager 420 then determines a document type of the document (e.g., a purchase order, an invoice, etc.) based on the determined document format and document version of the document and identifies a document mapping in the integration configuration that specifies a transmit direction of "receive," a source document format and source document format version that matches the determined document format and document format version of the document, and a document type that matches the identified document type of the document. Next, document manager 420 transforms the document from the determined document format to the target document format and target document format version specified in the document mapping by using the transformation definitions stored in transformation definitions storage 130 and generating a version of the document in the target document format and target document format version.

Figure 5:
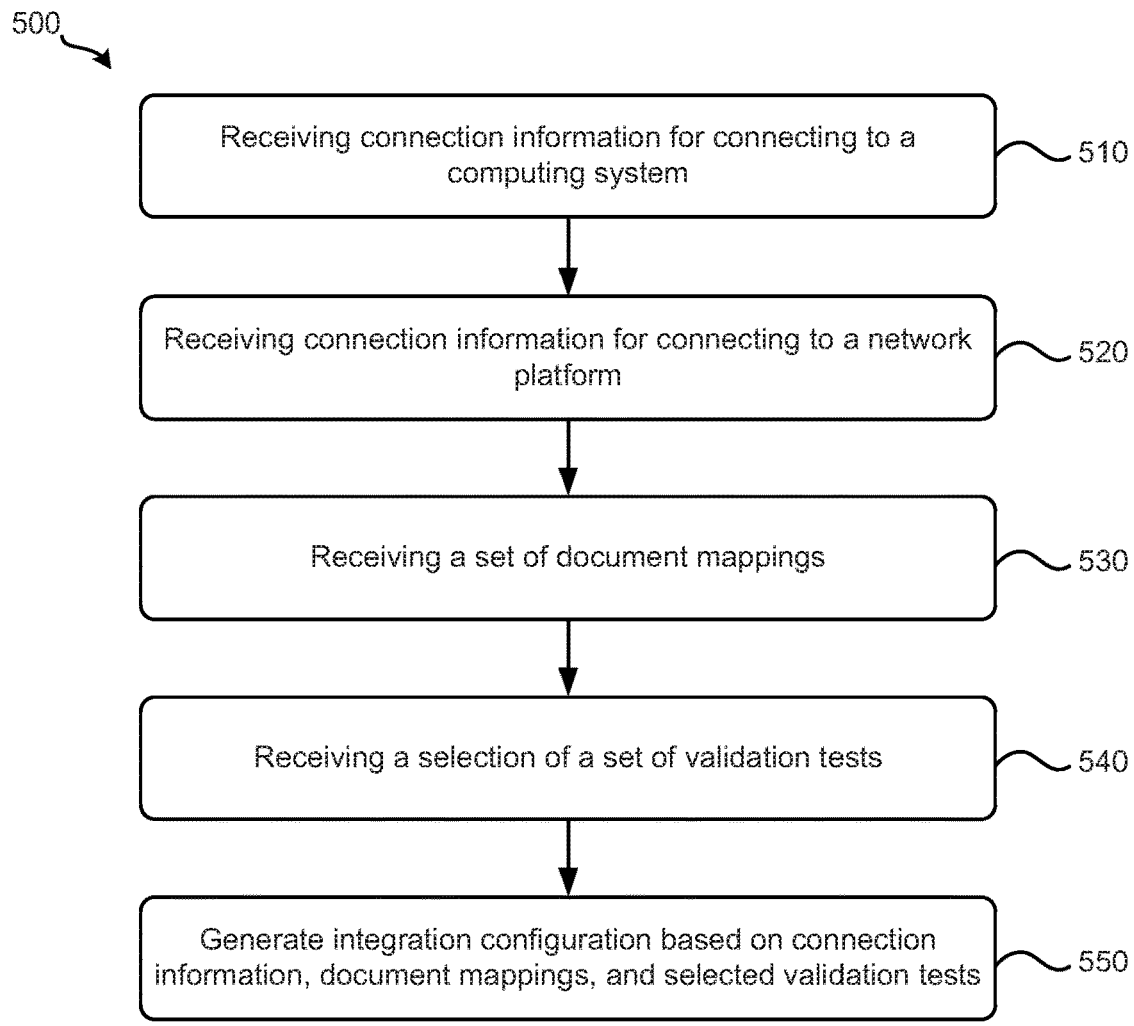
FIG. 5 illustrates a process for creating an integration configuration according to some embodiments.

FIG. 5 illustrates a process 500 for creating an integration configuration according to some embodiments. In some embodiments, integration manager 115 performs process 500. Process 500 begins by receiving, at 510, connection information for connecting to a computing system 105. Such connection information may include a connection/transport type (e.g., an AS2 connection/transport, an X.400 connection/transport, an SMTP connection/transport, an HTTPS connection/transport, etc.), a set of document types, a URL associated with the computing system 105, and an authentication type. In some embodiments, process 500 receives the connection information from a user of client device 110 through a GUI that process 500 provides to client device 110.

Next, process 500 receives, at 520, connection information for connecting to a network platform (e.g., a network platform managed by network platform manager 140). This connection information may include a connection/transport type (e.g., an AS2 connection/transport, an X.400 connection/transport, an SMTP connection/transport, an HTTPS connection/transport, etc.), a set of document types, a URL associated with the network platform, and an authentication type. In some embodiments, process 500 receives the connection information from a user of client device 110 through a GUI that process 500 provides to client device 110.

Process 500 then receives, at 530, a set of document mappings. As explained above, each document mapping can specify a transmit direction, a source document format, a version of the source document format, a target document format, a version of the target document format, and a document type. In some embodiments, process 500 receives the set of document mappings from a user of client device 110 through a GUI that process 500 provides to client device 110.

Next, process 500 receives, at 540, a selection of a set of validation tests to be performed on the integration configuration. As described above, the set of validation tests may be selected from the collection of validation test definitions stored in validation test definitions storage 135, which may include a set of order request validation tests, a set of change order request validation tests, a set of confirmation request validation tests, a set of shipment notice request validation tests, and a set of invoice detail request validation test. In some embodiments, process 500 receives the selection of the set of validation tests from a user of client device 110 through a GUI that process 500 provides to client device 110. Finally, process 500 generates, at 550, the integration configuration based on the connection information, the document mappings, and the selected validation tests.

Figure 6:
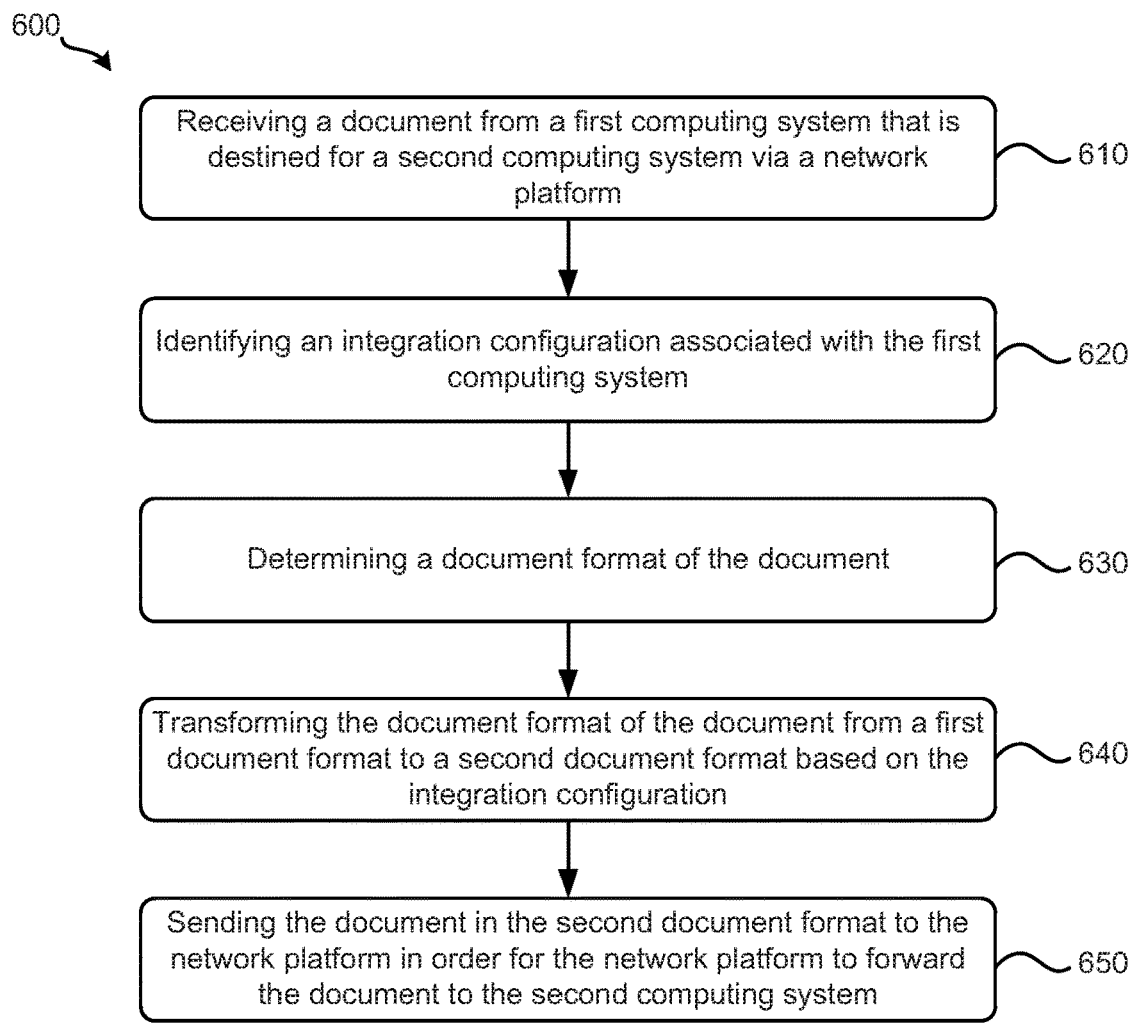
FIG. 6 illustrates a process for processing documents based on an integration configuration according to some embodiments.

FIG. 6 illustrates a process 600 for processing documents based on an integration configuration according to some embodiments. In some embodiments, integration manager 115 performs process 600. Process 600 starts by receiving, at 610, a document from a first computing system (e.g., a computing system 105) that is destined for a second computing system (e.g., a computing system 145) via a network platform (e.g., a network platform managed by network platform manager 140).

Next, process 600 identifies, at 620, an integration configuration stored in integration configurations storage 120 that is associated with the first computing system. Process 600 then determines, at 630, a document format and the document format version of the document based on the document format definitions stored in document format definitions storage 125. In some embodiments, process 600 determines the document format and document format version of the document by identifying a document format definition in document format definitions storage 125 that specifies a document schema that matches the document schema of the document.

Once the document format of the document is determined, process 600 transforms, at 640, the document format of the document from a first document format to a second document format based on the integration configuration. Specifically, process 600 identifies a document mapping in the integration configuration that specifies a transmit direction of "send," a source document format and source document format version that matches the determined document format and document format version of the document, and a document type that matches the identified document type of the document. Process 600 then identifies a transformation definition in transformation definitions storage 130 that is configured to transform a document from the determined document format of the document to the target document format specified in the identified document mapping. Next, process 600 processes the document based on the identified transformation definition in order to generate a version of the document in the target document format (i.e., the second document format) and target document format version specified in the identified document mapping.

Finally, process 600 sends, at 650, the document in the second document format to the network platform in order for the network platform (e.g., via the network platform manager 140) to forward the document to the second computing system. In some embodiments, the second document format is a common intermediary document format (e.g., a cXML format) supported by the network platform. Process 600 may send the document to the network platform by establishing a connection to the network platform managed by network platform manager 140 according to the network platform connection information specified in the integration configuration.

Figure 7:
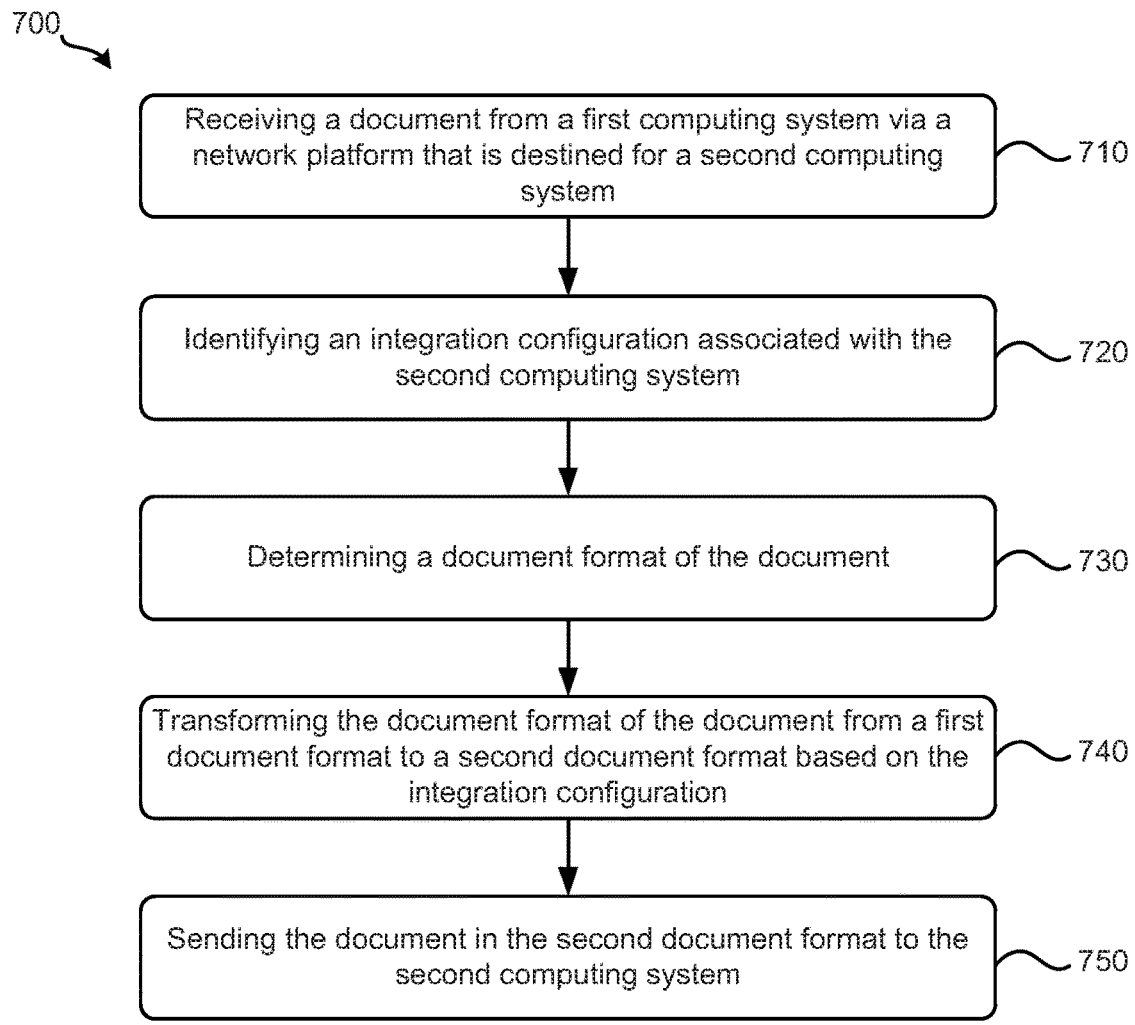
FIG. 7 illustrates a process for processing documents based on an integration configuration according to some embodiments.

FIG. 7 illustrates a process 700 for processing documents based on an integration configuration according to some embodiments. In some embodiments, integration manager 115 performs process 700. Process 700 begins by receiving, at 710, a document from a first computing system (e.g., a computing system 145) via a network platform (e.g., a network platform managed by network platform manager 140) that is destined for a second computing system (e.g., a computing system 105).

Process 700 then identifies, at 720, an integration configuration stored in integration configurations storage 120 that is associated with the second computing system. Next, process 700 determines, at 730, a document format and the document format version of the document based on the document format definitions stored in document format definitions storage 125. In some embodiments, process 700 determines the document format and document format version of the document by identifying a document format definition in document format definitions storage 125 that specifies a document schema that matches the document schema of the document.

Process 700 then transforms, at 740, the document format of the document from a first document format to a second document format based on the integration configuration. In particular, process 700 identifies a document mapping in the integration configuration that specifies a transmit direction of "receive," a source document format and source document format version that matches the determined document format and document format version of the document, and a document type that matches the identified document type of the document. Next, process 700 identifies a transformation definition in transformation definitions storage 130 that is configured to transform a document from the determined document format of the document to the target document format specified in the identified document mapping. Process 700 then processes the document based on the identified transformation definition in order to generate a version of the document in the target document format (i.e., the second document format) and target document format version specified in the identified document mapping.

Finally, process 700 sends, at 750, the document in the second document format to the second computing system. In some embodiments, process 700 sends the document by establishing a connection to the computing system 105 according to the computing system connection information specified in the integration configuration.

Figure 8:
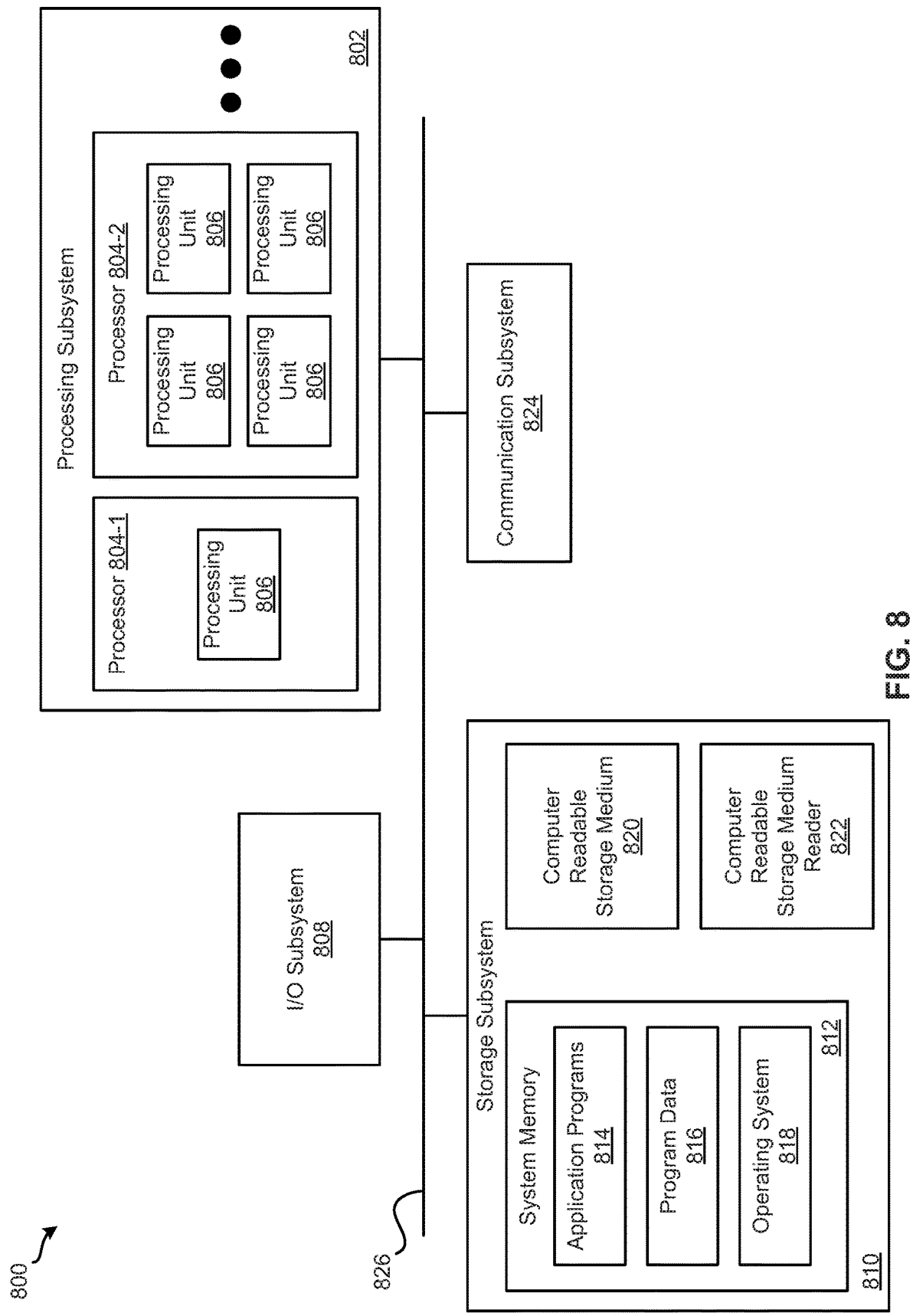
FIG. 8 illustrates an exemplary computer system for implementing various embodiments described above.

FIG. 8 illustrates an exemplary computer system 800, in which various embodiments may be implemented. For example, computer system 800 may be used to implement computing systems 105*a-n*, client device 110, integration manager 115, network platform manager 140, and computing systems 145*a-k*. Computer system 800 may be a desktop computer, a laptop, a server computer, or any other type of computer system or combination thereof. Computer system 800 can implement many of the operations, methods, and/or processes described above (e.g., processes 500, 600, and 700). As shown in FIG. 8, computer system 800 includes processing subsystem 802, which communicates, via bus subsystem 826, with input/output (I/O) subsystem 808, storage subsystem 810 and communication subsystem 824.

Bus subsystem 826 is configured to facilitate communication among the various components and subsystems of computer system 800. While bus subsystem 826 is illustrated in FIG. 8 as a single bus, one of ordinary skill in the art will understand that bus subsystem 826 may be implemented as multiple buses. Bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 802, which can be implemented as one or more integrated circuits (e.g., a conventional microprocessor or microcontroller), controls the operation of computer system 800. Processing subsystem 802 may include one or more processors 804. Each processor 804 may include one processing unit 806 (e.g., a single core processor such as processor 804-1) or several processing units 806 (e.g., a multicore processor such as processor 804-2). In some embodiments, processors 804 of processing subsystem 802 may be implemented as independent processors while, in other embodiments, processors 804 of processing subsystem 802 may be implemented as multiple processors integrate into a single chip or multiple chips. Still, in some embodiments, processors 804 of processing subsystem 802 may be implemented as a combination of independent processors and multiple processors integrated into a single chip or multiple chips.

In some embodiments, processing subsystem 802 can execute a variety of programs or processes in response to program code and can maintain multiple concurrently executing programs or processes. At any given time, some or all of the program code to be executed can reside in processing subsystem 802 and/or in storage subsystem 810. Through suitable programming, processing subsystem 802 can provide various functionalities, such as the functionalities described above by reference to processes 500, 600, 700, etc.

I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 800 to a user or another device (e.g., a printer).

As illustrated in FIG. 8, storage subsystem 810 includes system memory 812, computer-readable storage medium 820, and computer-readable storage medium reader 822. System memory 812 may be configured to store software in the form of program instructions that are loadable and executable by processing subsystem 802 as well as data generated during the execution of program instructions. In some embodiments, system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 812 may include different types of memory, such as static random access memory (SRAM) and/or dynamic random access memory (DRAM). System memory 812 may include a basic input/output system (BIOS), in some embodiments, that is configured to store basic routines to facilitate transferring information between elements within computer system 800 (e.g., during start-up). Such a BIOS may be stored in ROM (e.g., a ROM chip), flash memory, or any other type of memory that may be configured to store the BIOS.

As shown in FIG. 8, system memory 812 includes application programs 814, program data 816, and operating system (OS) 818. OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 820 may be a non-transitory computer-readable medium configured to store software (e.g., programs, code modules, data constructs, instructions, etc.). Many of the components (e.g., integration manager 115, network platform manager 140, etc.) and/or processes (e.g., processes 500, 600, and 700) described above may be implemented as software that when executed by a processor or processing unit (e.g., a processor or processing unit of processing subsystem 802) performs the operations of such components and/or processes. Storage subsystem 810 may also store data used for, or generated during, the execution of the software.

Storage subsystem 810 may also include computer-readable storage medium reader 822 that is configured to communicate with computer-readable storage medium 820. Together and, optionally, in combination with system memory 812, computer-readable storage medium 820 may comprehensively represent remote, local, fixed, and/or removable storage devices plus storage media for temporarily and/or more permanently containing, storing, transmitting, and retrieving computer-readable information.

Computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 824 serves as an interface for receiving data from, and transmitting data to, other devices, computer systems, and networks. For example, communication subsystem 824 may allow computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 824 may provide components configured for wired communication (e.g., Ethernet) in addition to or instead of components configured for wireless communication.

One of ordinary skill in the art will realize that the architecture shown in FIG. 8 is only an example architecture of computer system 800, and that computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
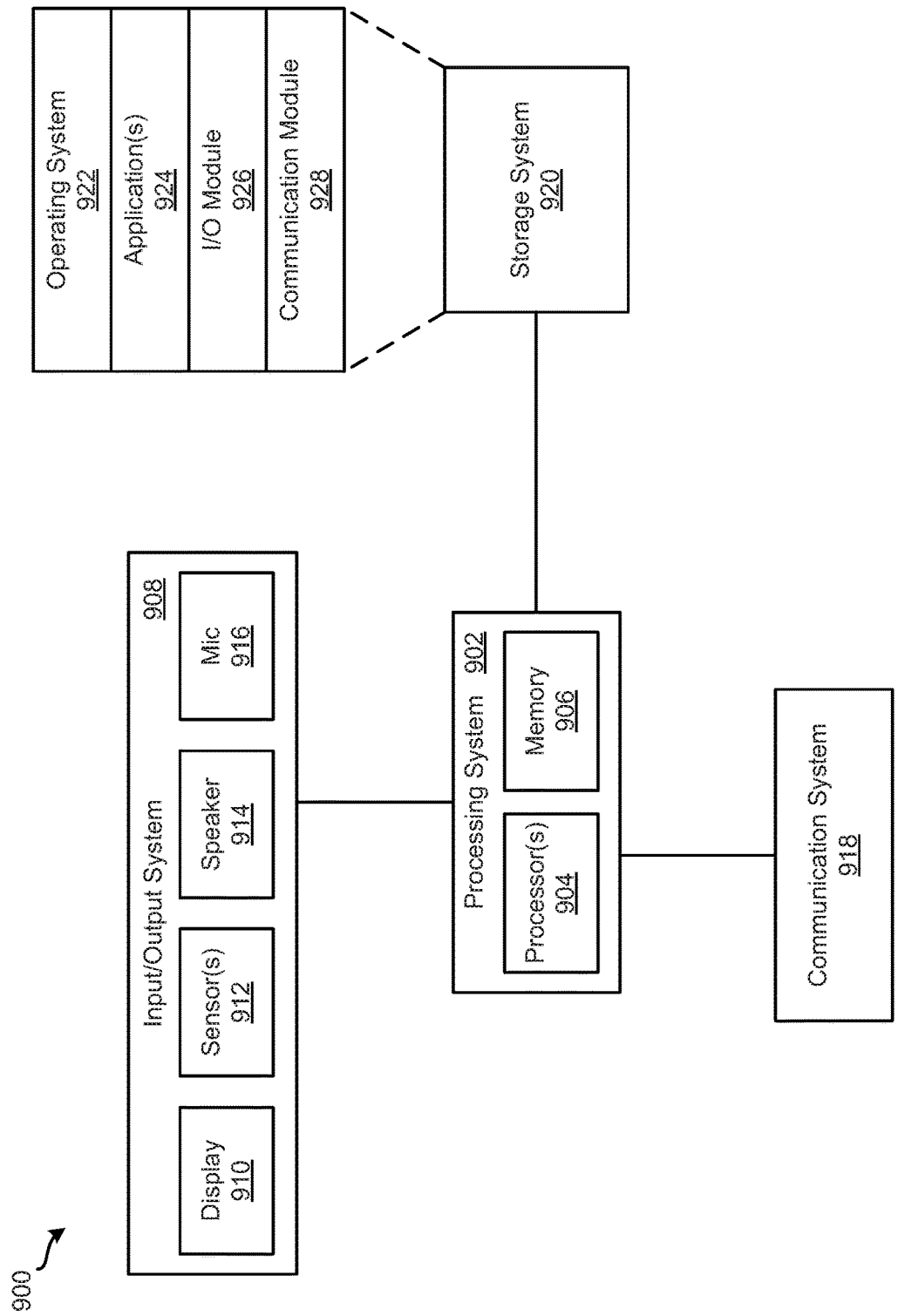
FIG. 9 illustrates an exemplary computing device for implementing various embodiments described above.

FIG. 9 illustrates an exemplary computing device 900 for implementing various embodiments described above. For example, computing device 900 may be used to implement client device 110. Computing device 900 may be a cellphone, a smartphone, a wearable device, an activity tracker or manager, a tablet, a personal digital assistant (PDA), a media player, or any other type of mobile computing device or combination thereof. As shown in FIG. 9, computing device 900 includes processing system 902, input/output (I/O) system 908, communication system 918, and storage system 920. These components may be coupled by one or more communication buses or signal lines.

Processing system 902, which can be implemented as one or more integrated circuits (e.g., a conventional microprocessor or microcontroller), controls the operation of computing device 900. As shown, processing system 902 includes one or more processors 904 and memory 906. Processors 904 are configured to run or execute various software and/or sets of instructions stored in memory 906 to perform various functions for computing device 900 and to process data.

Each processor of processors 904 may include one processing unit (e.g., a single core processor) or several processing units (e.g., a multicore processor). In some embodiments, processors 904 of processing system 902 may be implemented as independent processors while, in other embodiments, processors 904 of processing system 902 may be implemented as multiple processors integrate into a single chip. Still, in some embodiments, processors 904 of processing system 902 may be implemented as a combination of independent processors and multiple processors integrated into a single chip.

Memory 906 may be configured to receive and store software (e.g., operating system 922, applications 924, I/O module 926, communication module 928, etc. from storage system 920) in the form of program instructions that are loadable and executable by processors 904 as well as data generated during the execution of program instructions. In some embodiments, memory 906 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 908 is responsible for receiving input through various components and providing output through various components. As shown for this example, I/O system 908 includes display 910, one or more sensors 912, speaker 914, and microphone 916. Display 910 is configured to output visual information (e.g., a graphical user interface (GUI) generated and/or rendered by processors 904). In some embodiments, display 910 is a touch screen that is configured to also receive touch-based input. Display 910 may be implemented using liquid crystal display (LCD) technology, light-emitting diode (LED) technology, organic LED (OLED) technology, organic electro luminescence (OEL) technology, or any other type of display technologies. Sensors 912 may include any number of different types of sensors for measuring a physical quantity (e.g., temperature, force, pressure, acceleration, orientation, light, radiation, etc.). Speaker 914 is configured to output audio information and microphone 916 is configured to receive audio input. One of ordinary skill in the art will appreciate that I/O system 908 may include any number of additional, fewer, and/or different components. For instance, I/O system 908 may include a keypad or keyboard for receiving input, a port for transmitting data, receiving data and/or power, and/or communicating with another device or component, an image capture component for capturing photos and/or videos, etc.

Communication system 918 serves as an interface for receiving data from, and transmitting data to, other devices, computer systems, and networks. For example, communication system 918 may allow computing device 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 918 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 918 may provide components configured for wired communication (e.g., Ethernet) in addition to or instead of components configured for wireless communication.

Storage system 920 handles the storage and management of data for computing device 900. Storage system 920 may be implemented by one or more non-transitory machine-readable mediums that are configured to store software (e.g., programs, code modules, data constructs, instructions, etc.) and store data used for, or generated during, the execution of the software.

In this example, storage system 920 includes operating system 922, one or more applications 924, I/O module 926, and communication module 928. Operating system 922 includes various procedures, sets of instructions, software components and/or drivers for controlling and managing general system tasks (e.g., memory management, storage device control, power management, etc.) and facilitates communication between various hardware and software components. Operating system 922 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 924 can include any number of different applications installed on computing device 900. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 926 manages information received via input components (e.g., display 910, sensors 912, and microphone 916) and information to be outputted via output components (e.g., display 910 and speaker 914). Communication module 928 facilitates communication with other devices via communication system 918 and includes various software components for handling data received from communication system 918.

One of ordinary skill in the art will realize that the architecture shown in FIG. 9 is only an example architecture of computing device 900, and that computing device 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
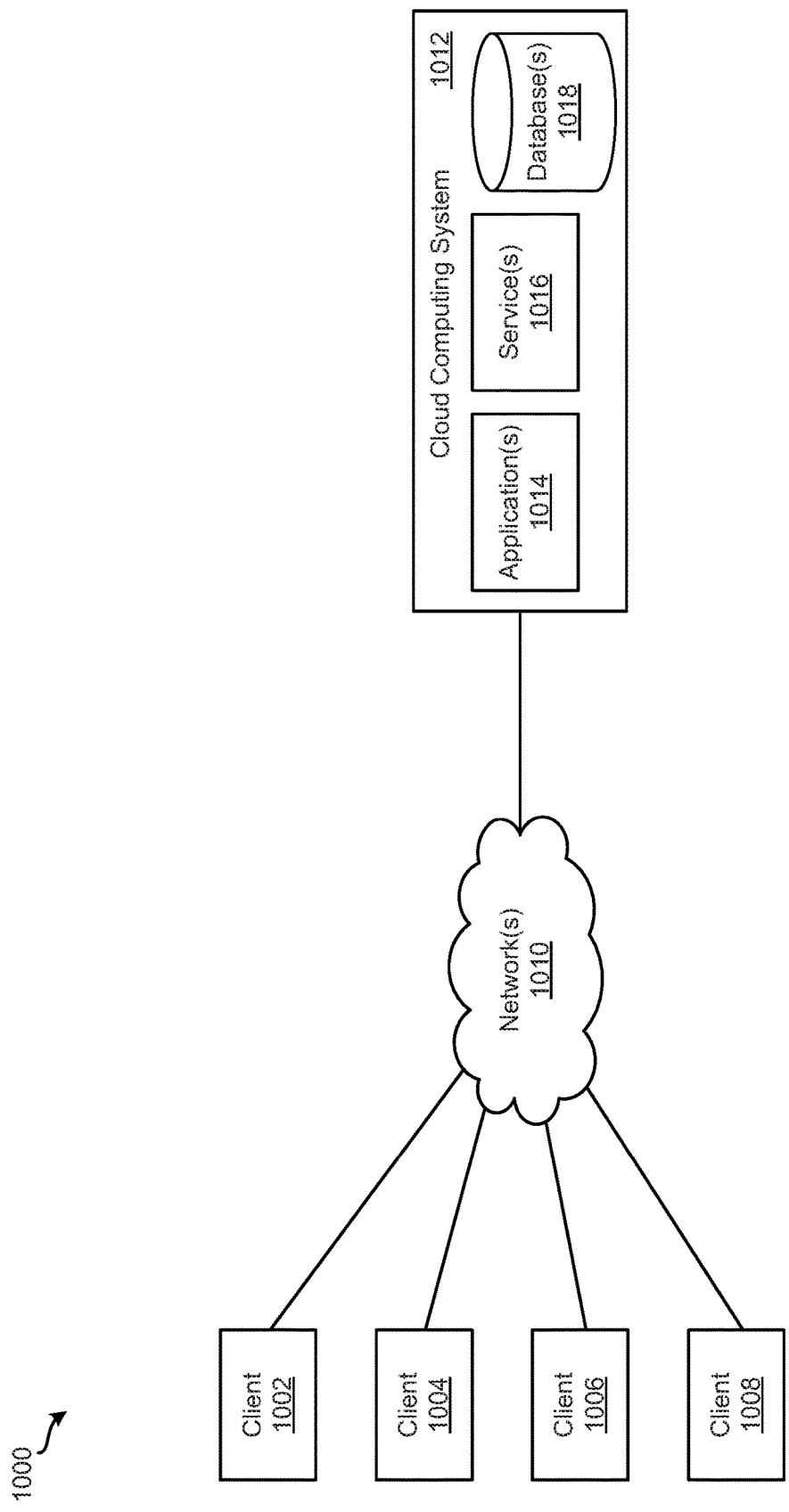
FIG. 10 illustrates an exemplary system for implementing various embodiments described above.

FIG. 10 illustrates an exemplary system 1000 for implementing various embodiments described above. For example, cloud computing system 1020 of system 1000 may be used to implement integration manager 115 and/or network platform manager 140 and client devices 1002-1008 may be used to implement computing systems 105a-n, client device 110, and/or computing systems 145a-k. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1000 is referred to as a "cloud service." Typically, servers and systems that make up cloud computing system 1000 are different from the on-premises servers and systems of a customer. For example, cloud computing system 1000 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, storages 120-135 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 800 or computing device 900, as described above by reference to FIGS. 8 and 9, respectively. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:
    receiving from a first client device first configuration settings for a first integration configuration associated with a first computing system, the first configuration settings comprising connection information for connecting to a network platform, a set of document mappings, and a predefined subset of a plurality of validation tests to be performed on the first integration connection;
    in response to receiving from the first client device a request to create the first integration configuration associated with the first computing system, creating the first integration configuration based on the first configurations settings, the first integration configuration comprising the connection information, the set of document mappings, and the predefined subset of the plurality of validation tests;
    receiving a first document from the first computing system that is destined for a second computing system via the network platform, the first document comprising a first document identifier (ID) for uniquely identifying the first document, a first document type of the first document, a first sender ID for identifying the first client device as a first sender of the first document, and a first network platform ID for the network platform to identify the second computing system as a receiver of the first document;
    identifying the first integration configuration associated with the first computing system;
    identifying a first document format definition from a plurality of document format definitions stored in a storage, wherein each document format definition in the plurality of document format definitions specifies a particular document schema and a particular document format, wherein the particular document schema specified in the first document format definition matches a document schema of the first document;
    determining a document format of the first document as being the particular document format specified in the first document format definition;
    transforming the document format of the first document from a first document format to a second document format based on the first integration configuration;
    sending the first document in the second document format to the network platform in order for the network platform to forward the first document to the second computing system based on the first network platform ID specified in the first document;
    receiving from a second client device second configuration settings for a second integration configuration associated with a third computing system;
    in response to receiving from the second client device a request to create the second integration configuration associated with the third computing system, creating the second integration configuration based on the second configuration settings;
    receiving a second document from the third computing system that is destined for a fourth computing system via the network platform, the second document comprising a second document identifier (ID) for uniquely identifying the second document, a second document type of the second document, a second sender ID for identifying the second client device as a second sender of the second document, and a second network platform ID for the network platform to identify the fourth computing system as a receiver of the second document;
    identifying the second integration configuration associated with the third computing system;
    identifying a second document format definition from the plurality of document format definitions stored in the storage, wherein the particular document schema specified in the second document format definition matches a document schema of the second document;
    determining a document format of the second document as being the particular document format specified in the second document format definition;
    transforming the second document format of the document from a third document format to a fourth document format based on the second integration configuration; and
    sending the second document in the fourth document format to the network platform in order for the network platform to forward the second document to the fourth computing system based on the second network platform ID specified in the second document.

2. The non-transitory machine-readable medium of claim 1, wherein each document mapping in the set of document mappings specifies a transmit direction, a source document format, a version of the source document format, a target document format, a version of the target document format, and a document type.

3. The non-transitory machine-readable medium of claim 2, wherein the program further comprises a set of instructions for determining a document type of the first document.

4. The non-transitory machine-readable medium of claim 3, wherein transforming the document format of the first document comprises:
    determining a transmit direction of the first document;

determining a version of the document format of the first document; and identifying a document mapping in the set of document mappings of the first integration configuration that specifies a transmit direction that matches the transmit direction of the first document, a source document format that matches the determined document format of the first document, a version of the source document format that matches the version of the document format of the first document, and a document type that matches the determined document type of the first document.

5. The non-transitory machine-readable medium of claim 4, wherein transforming the document format of the first document further comprises generating a version of the first document in the version of the target document format specified in the identified document mapping.

6. The non-transitory machine-readable medium of claim 1, wherein the second document format is a common intermediary document format supported by the network platform.

7. The non-transitory machine-readable medium of claim 2, wherein sending the first document to the network platform comprises establishing a connection to the network platform using the connection information specified in the first integration configuration.

8. A method comprising:

receiving from a first client device first configuration settings for a first integration configuration associated with a first computing system, the first configuration settings comprising connection information for connecting to a network platform, a set of document mappings, and a predefined subset of a plurality of validation tests to be performed on the first integration connection;

in response to receiving from the first client device a request to create the first integration configuration associated with the first computing system, creating the first integration configuration based on the first configurations settings, the first integration configuration comprising the connection information, the set of document mappings, and the predefined subset of the plurality of validation tests;

receiving a first document from the first computing system that is destined for a second computing system via the network platform, the first document comprising a first document identifier (ID) for uniquely identifying the first document, a first document type of the first document, a first sender ID for identifying the first client device as a first sender of the first document, and a first network platform ID for the network platform to identify the second computing system as a receiver of the first document;

identifying the first integration configuration associated with the first computing system;

identifying a first document format definition from a plurality of document format definitions stored in a storage, wherein each document format definition in the plurality of document format definitions specifies a particular document schema and a particular document format, wherein the particular document schema specified in the first document format definition matches a document schema of the first document;

determining a document format of the first document as being the particular document format specified in the first document format definition;

transforming the document format of the first document from a first document format to a second document format based on the first integration configuration;

sending the first document in the second document format to the network platform in order for the network platform to forward the first document to the second computing system based on the first network platform ID specified in the first document;

receiving from a second client device second configuration settings for a second integration configuration associated with third computing system;

in response to receiving from the second client device a request to create the second integration configuration associated with the third computing system, creating the second integration configuration based on the second configurations settings;

receiving a second document from the third computing system that is destined for a fourth computing system via the network platform, the second document comprising a second document identifier (ID) for uniquely identifying the second document, a second document type of the second document, a second sender ID for identifying the second client device as a second sender of the second document, and a second network platform ID for the network platform to identify the fourth computing system as a receiver of the second document;

identifying the second integration configuration associated with the third computing system;

identifying a second document format definition from the plurality of document format definitions stored in the storage, wherein the particular document schema specified in the second document format definition matches a document schema of the second document;

determining a document format of the second document as being the particular document format specified in the second document format definition;

transforming the document format of the second document from a third document format to a fourth document format based on the second integration configuration; and sending the second document in the fourth document format to the network platform in order for the network platform to forward the second document to the fourth computing system based on the second network platform ID specified in the second document.

9. The method of claim 8, wherein each document mapping in the set of document mappings specifies a transmit direction, a source document format, a version of the source document format, a target document format, a version of the target document format, and a document type.

10. The method of claim 9 further comprising determining a document type of the first document.

11. The method of claim 10, wherein transforming the document format of the first document comprises:

determining a transmit direction of the first document;

determining a version of the document format of the first document; and identifying a document mapping in the set of document mappings of the first integration configuration that specifies a transmit direction that matches the transmit direction of the first document, a source document format that matches the determined document format of the first document, a version of the source document format that matches the version of the document format of the first document, and a document type that matches the determined document type of the first document.

12. The method of claim 11, wherein transforming the document format of the first document further comprises generating a version of the first document in the version of the target document format specified in the identified document mapping.

13. The method of claim 8, wherein the second document format is a common intermediary document format supported by the network platform.

14. The method of claim 9, wherein sending the first document to the network platform comprises establishing a connection to the network platform using the connection information specified in the first integration configuration.

15. A system comprising:
a set of processing units; and
a non-transitory computer-readable medium storing instructions that when executed by at least one processing unit in the set of processing units cause the at least one processing unit to:
receive from a first client device first configuration settings for a first integration configuration associated with a first computing system, the first configuration settings comprising connection information for connecting to a network platform, a set of document mappings, and a predefined subset of a plurality of validation tests to be performed on the first integration connection;
in response to receiving from the first client device a request to create the first integration configuration associated with the first computing system, create the first integration configuration based on the first configurations settings, the first integration configuration comprising the connection information, the set of document mappings, and the predefined subset of the plurality of validation tests;
receive a first document from the first computing system that is destined for a second computing system via the network platform, the first document comprising a first document identifier (ID) for uniquely identifying the first document, a first document type of the first document, a first sender ID for identifying the first client device as a first sender of the first document, and a first network platform ID for the network platform to identify the second computing system as a receiver of the first document;
identify the first integration configuration associated with the first computing system;
identify a first document format definition from a plurality of document format definitions stored in a storage, wherein each document format definition in the plurality of document format definitions specifies a particular document schema and a particular document format, wherein the particular document schema specified in the first document format definition matches a document schema of the first document;
determine a document format of the first document as being the particular document format specified in the first document format definition;
transform the document format of the first document from a first document format to a second document format based on the first integration configuration;
send the first document in the second document format to the network platform in order for the network platform to forward the first document to the second computing system based on the first network platform ID specified in the first document;
receive from a second client device second configuration settings for a second integration configuration associated with a third computing system;
in response to receiving from the second client device a request to create the second integration configuration associated with the third computing system, create the second integration configuration based on the second configurations settings;
receive a second document from the third computing system that is destined for a fourth computing system via the network platform, the second document comprising a second document identifier (ID) for uniquely identifying the second document, a second document type of the second document, a second sender ID for identifying the second client device as a second sender of the second document, and a second network platform ID for the network platform to identify the fourth computing system as a receiver of the second document;
identify the second integration configuration associated with the third computing system;
identify a second document format definition from the plurality of document format definitions stored in the storage, wherein the particular document schema specified in the second document format definition matches a document schema of the second document;
determine a document format of the second document as being the particular document format specified in the second document format definition;
transform the document format of the second document from a third document format to a fourth document format based on the second integration configuration; and
send the second document in the fourth document format to the network platform in order for the network platform to forward the second document to the fourth computing system based on the second network platform ID specified in the second document.

16. The system of claim 15, wherein each document mapping in the set of document mappings specifies a transmit direction, a source document format, a version of the source document format, a target document format, a version of the target document format, and a document type.

17. The system of claim 16, wherein the instructions further cause the at least one processing unit to determine a document type of the first document.

18. The system of claim 17, wherein transforming the document format of the first document comprises:
determining a transmit direction of the first document;
determining a version of the document format of the first document; and
identifying a document mapping in the set of document mappings of the first integration configuration that specifies a transmit direction that matches the transmit direction of the first document, a source document format that matches the determined document format of the first document, a version of the source document format that matches the version of the document format of the first document, and a document type that matches the determined document type of the first document.

19. The system of claim 18, wherein transforming the document format of the first document further comprises generating a version of the first document in the version of the target document format specified in the identified document mapping.

20. The system of claim 15, wherein sending the first document to the network platform comprises establishing a connection to the network platform using the connection information specified in the first integration configuration.

\* \* \* \* \*

UNITED STATES PATENT AND TRADEMARK OFFICE
CERTIFICATE OF CORRECTION

| | |
|---|---|
| PATENT NO. | : 11,074,270 B2 |
| APPLICATION NO. | : 15/382393 |
| DATED | : July 27, 2021 |
| INVENTOR(S) | : Sachin Deshmukh et al. |

It is certified that error appears in the above-identified patent and that said Letters Patent is hereby corrected as shown below:

In the Specification

On Column 6, Lines 16-17, please delete " ARE THERE ANY OTHER DOCUMENT TYPES THAT SHOULD BE INCLUDED? "

Signed and Sealed this
Thirtieth Day of May, 2023

Katherine Kelly Vidal
*Director of the United States Patent and Trademark Office*